United States Patent
Yamamoto et al.

(12)

(10) Patent No.: US 6,715,511 B2
(45) Date of Patent: Apr. 6, 2004

(54) TUBE MADE OF VULCANIZED ELASTOMER COMPRISING POLYAMIDE AND EVOH BARRIER LAYERS

(75) Inventors: Jun Yamamoto, Tokyo (JP); Joachim Merziger, Evreux (FR); Christophe Maldeme, Rambouillet (FR)

(73) Assignee: Atofina, Puteaux (FR)

( * ) Notice: Subject to any disclaimer, the term of this patent is extended or adjusted under 35 U.S.C. 154(b) by 0 days.

(21) Appl. No.: 10/303,063

(22) Filed: Nov. 25, 2002

(65) Prior Publication Data

US 2003/0124289 A1 Jul. 3, 2003

(30) Foreign Application Priority Data

Nov. 23, 2001 (FR) .............................. 01 15184

(51) Int. Cl.⁷ ................................ F16L 11/04
(52) U.S. Cl. ..................... 138/141; 138/137; 138/140; 428/36.91
(58) Field of Search ................. 138/137, 140, 138/141, DIG. 7; 428/36.6–36.9, 36.91

(56) References Cited

U.S. PATENT DOCUMENTS

| | | | | |
|---|---|---|---|---|
| 5,411,724 A | * | 5/1995 | Beyer et al. ............. | 428/36.91 |
| 5,618,629 A | | 4/1997 | Takamatsu et al. ..... | 138/141 X |
| 6,177,162 B1 | * | 1/2001 | Siour et al. .............. | 428/36.91 |
| 6,302,153 B1 | | 10/2001 | Merziger ................... | 138/137 |
| 6,555,243 B2 | * | 4/2003 | Flepp et al. ............. | 428/474.4 |

FOREIGN PATENT DOCUMENTS

| | | |
|---|---|---|
| DE | 42 43 652 A1 | 7/1993 |
| EP | 0 731 308 A1 | 9/1996 |
| EP | 1 036 967 A1 | 9/2000 |
| EP | 1 122 060 A1 | 8/2001 |
| WO | 95/16564 | 6/1995 |

* cited by examiner

*Primary Examiner*—Patrick Brinson
(74) *Attorney, Agent, or Firm*—Millen, White, Zelano & Branigan, P.C.

(57) ABSTRACT

The present invention relates to a multilayer tube comprising, in its radial direction from the outside inwards:

a first layer of vulcanized elastomer forming the outer layer, a second layer of EVOH or of an EVOH-based blend, a third layer of a blend of a polyamide (A) and a polyolefin (B) having a polyamide matrix, optionally, an inner layer of vulcanized elastomer, the layers being successive and adhering to one another in their respective contact region.

It is also possible to place a tie layer between the first and second layers, and likewise between the optional inner layer and the third layer.

The tube of the invention may also include a reinforcing layer of the textile type, for example made of polyester or of metal wires, the said layer being placed between the first and second layers. This reinforcing layer may be between the tie layer and the EVOH layer or between the tie layer and the outer layer or else the tie may be placed in the interstices of the reinforcing layer.

The tubes of the invention may have an outside diameter of between 8 mm and 25 cm. The thickness of the EVOH layer may be between 10 and 200 μm, that of the blend of the polyamide (A) and the polyolefin (B) having a polyamide matrix between 25 and 500 μm, and that of the optional tie layer between 10 and 100 μm.

These tubes are used for fluids in air conditioning systems.

18 Claims, No Drawings

TUBE MADE OF VULCANIZED ELASTOMER COMPRISING POLYAMIDE AND EVOH BARRIER LAYERS

FIELD OF THE INVENTION

The present invention relates to a tube made of vulcanized elastomer comprising polyamide-based and EVOH barrier layers.

The invention is useful for fluids in air conditioning systems. It is also useful for liquids containing volatile substances, preventing the liquid from being depleted in this volatile substance. The invention is also useful for the cooling liquid in engines and for oil. The tubes of the invention are, for example, of the type:

rubber (outer layer)/EVOH/blend of polyamide and of polyolefin having a polyamide matrix.

PRIOR ART AND TECHNICAL PROBLEM

Patent EP 683 725 describes hoses consisting, in succession, of an inner layer made of PVDF (polyvinylidene fluoride), a coextrusion tie and an outer layer made of vulcanized elastomer. They have the advantage of exhibiting good resistance to aggressive chemical fluids and of being a barrier to many fluids, particularly petrol and the fluids used in air conditioning circuits. However, they may be brittle at low temperature. It is known to improve the impact strength of PVDF, but this is to the detriment of its chemical resistance and its barrier properties.

The prior art has described many tubes having a polyamide outer layer for motor-vehicle petrol. Thus, Patent Application EP 0 731 308 discloses tubes based on polyamides and on EVOH for transporting petrol. These tubes may have a four-layer structure comprising, respectively, a PA-12 outer layer, a binder layer, which is a grafted polyolefin, an EVOH layer and an inner layer in contact with the petrol, comprising a blend of a polyamide and a polyolefin having a polyamide matrix.

Patent EP 428833 describes a three-layer tube comprising, respectively, a PA-12 outer layer, a binder layer which is a grafted polyolefin and an EVOH inner layer in contact with the petrol.

Patents EP 428834 and EP 477606 describe a five-layer tube comprising, respectively, a PA-12 outer layer, a binder layer which is a grafted polyolefin, a PA-6 layer, an EVOH layer and a PA-6 inner layer in contact with the petrol.

U.S. Pat. No. 5,038,833 describes a three-layer tube comprising, respectively, a PA-12 outer layer, an EVOH layer and a PA-12 inner layer in contact with the petrol.

Patent EP 1 036 967 describes a polyamide-based multilayer tube, characterized in that it comprises, in its radial direction from the inside outwards:

an inner layer formed from a polyamide or from a blend of a polyamide and a polyolefin with a polyamide matrix, this layer including a dispersed filler consisting of electrically conducting carbon black producing a surface resistivity of less than $10^6$ Ω/□;

an interlayer formed from a polyamide or from a blend of a polyamide and a polyolefin having a polyamide matrix, this layer not having any electrically conducting carbon black or an electrically significant amount of this carbon black;

an EVOH layer;

a tie layer;

a polyamide outer layer, the above layers adhering to one another in their respective contact region. This tube has very good mechanical properties and is impermeable to petrol.

All these tubes having a polyamide outer layer are too expensive for air conditioning fluids. This is because such tubes have been designed to withstand very severe mechanical conditions, in terms of the inflammability of petrol and this mechanical behaviour is not necessary for air conditioning fluids. In addition, these polyamide-based tubes are too rigid and it is difficult to fit them into motor vehicles. They are suitable for petrol because an outside diameter of 8 mm is sufficient, but for air conditioning the diameters may be larger.

What has now been developed is a tube made of a vulcanized elastomer (rubber) comprising an EVOH layer and a layer of a blend of a polyamide and a polyolefin having a polyamide matrix.

BRIEF DESCRIPTION OF THE INVENTION

The present invention relates to a multilayer tube comprising, in its radial direction from the outside inwards:

a first layer of vulcanized elastomer forming the outer layer, a second layer of EVOH or of an EVOH-based blend, a third layer of a blend of a polyamide (A) and a polyolefin (B) having a polyamide matrix, optionally, an inner layer of vulcanized elastomer, the layers being successive and adhering to one another in their respective contact region.

It is also possible to place a tie layer between the first and second layers, and likewise between the optional inner layer and the third layer.

The tube of the invention may also include a reinforcing layer of the textile type, for example made of polyester or of metal wires, the said layer being placed between the first and second layers. This reinforcing layer may be between the tie layer and the EVOH layer or between the tie layer and the outer layer or else the tie may be placed in the interstices of the reinforcing layer.

The tubes of the invention may have an outside diameter of between 8 mm and 25 cm. The thickness of the EVOH layer may be between 10 and 200 μm, that of the blend of the polyamide (A) and the polyolefin (B) having a polyamide matrix between 25 and 500 μm, and that of the optional tie between 10 and 100 μm.

These tubes can be manufactured by coextrusion—each layer is introduced in the melt using an extruder into a coextrusion head which produces concentric streams forming the tube. This technique is known per se. The tube is then passed through an oven or heating tunnel in order to carry out the vulcanization (crosslinking) of the elastomer. It is recommended during the coextrusion to use a coextrusion head in which the stream of elastomer remains at a sufficiently low temperature (in general about 80 to 120° C.) in order not to cause vulcanization before the tube has been formed and above all to prevent the extruder from becoming blocked. It is also possible to manufacture by coextrusion a tube which does not include the first elastomer layer, and then to make this tube pass through a device called a "jacketing" device or "crosshead" in order to cover it with the elastomer layer. All that is then required, as above, is to pass the tube through an oven or heating tunnel in order to vulcanize (crosslink) the elastomer. If the tube includes an inner layer of vulcanized elastomer, the process then starts with the manufacture of a tube consisting of just this layer, which is then vulcanized and put back through a device called a "jacketing" or "crosshead" device in order to cover it with all the other layers, apart from the outer elastomer layer, the process then continuing as above.

DETAILED DESCRIPTION OF THE INVENTION

As regards the outer layer of vulcanized elastomer, the vulcanizable synthetic or natural elastomers which are suitable for carrying out the present invention are well known to those skilled in the art, in the definition of the present invention the term "elastomer" meaning that it may consist of blends of several elastomers.

These elastomers or blends of elastomers preferably have a compression set (CS) at 100° C. of less than 50%, generally between 5% and 40% and more preferably less than 30%.

Among these elastomers, mention may be made of natural rubber, polyisoprene with a high content of cis double bonds, a polymerized emulsion based on styrene/butadiene copolymer, a polybutadiene with a high content of cis double bonds obtained by nickel, cobalt, titanium or neodymium catalysis, a halogenated ethylene/propylene/diene terpolymer, a halogenated butyl rubber, a styrene/butadiene block copolymer, a styrene/isopropene block copolymer, halogenated products of the above polymers, an acrylonitrile/butadiene copolymer, an acrylic elastomer, a fluoroelastomer, chloroprene and epichlorohydrin rubbers.

If the tube of the invention does not include a tie layer, it is recommended that the elastomer be chosen from functionalized elastomers, elastomers with acrylate units, halogenated elastomers and epichlorohydrin rubbers. As regards functionalized elastomers, the function is advantageously a carboxylic acid or carboxylic acid anhydride function. When the elastomers mentioned above comprise no carboxylic acid radicals or anhydride radicals deriving from the said acids (which is the case for most of them), the said radicals will be provided by grafting the abovementioned elastomers in a known manner or by blends of elastomers, for example with elastomers containing acrylic units such as acrylic acid. The abovementioned vulcanizable elastomers preferably have a weight content of carboxylic acid or dicarboxylic acid anhydride radicals of between 0.3% and 10% relative to the said elastomers.

Similarly, it is possible to blend elastomers which have no acrylate units or functions, which are not halogenated and which are not epichlorohydrin rubbers, with at least one elastomer chosen from functionalized elastomers, elastomers containing acrylate units, halogenated elastomers and epichlorohydrin rubbers.

Among the elastomers mentioned above which may be selected are those included in the following group: carboxylated nitrile elastomers, acrylic elastomers, carboxylated polybutadienes, ethylene/propylene/diene terpolymers these being grafted, or blends of these polymers with the same elastomers but which are not grafted, such as nitrile rubbers, polybutadienes and ethylene/propylene/diene terpolymers, alone or as a blend.

The vulcanizing systems that are suitable for the present invention are well known to those skilled in the art and, consequently, the invention is not limited to one particular type of system.

When the elastomer is based on unsaturated monomer (butadiene, isoprene, vinyl norbornene, etc.), four types of vulcanizing system may be mentioned:

sulphur systems consisting of sulphur combined with the usual accelerators such as metal salts of dithiocarbamates (zinc dimethyldithiocarbamate, tellurium dimethyldithiocarbamate etc.), sulphenamides, etc.; the systems may also contain zinc oxide combined with stearic acid;

sulphur donor systems in which most of the sulphur used for the bridges is derived from sulphur-containing molecules such as the organosulphur compounds mentioned above;

phenolic resin systems consisting of difunctional phenol-formaldehyde resins which may be halogenated, combined with accelerators such as stannous chloride or zinc oxide;

peroxide systems: any free-radical donor may be used (dicumyl peroxides, etc.) in combination with zinc oxide and stearic acid.

When the elastomer is acrylic (polybutyl acrylate with acid or epoxy functional groups or any other reactive functional group allowing crosslinking), the usual diamine-based crosslinking agents are used (orthotoluidyl guanidine, diphenylguanidine, etc.) or blocked diamines (hexamethylenediamine carbamate, etc.) are used.

The elastomeric compositions may be modified for certain particular properties (for example improvement in the mechanical properties) by adding fillers such as carbon black, silica, kaolin, alumina, clay, talc, chalk, etc. These fillers may be surface-treated with silanes, polyethylene glycols or any other coupling molecule. In general, the content of fillers in parts by weight is between 5 and 100 per 100 parts of elastomers.

In addition, the compositions may be flexibilized with plasticizers such as mineral oils derived from petroleum, phthalic acid esters or sebacic acid esters, liquid polymeric plasticizers such as low-mass polybutadiene optionally carboxylated, and other plasticizers that are well known to those skilled in the art.

The vulcanization agent combinations used are such that they must allow the elastomer to be completely crosslinked at a rate resulting in good properties as regards resistance to separation of the elastomer layer from the first layer or from the tie layer.

With regard to the second layer, the EVOH copolymer is also called a saponified ethylene/vinyl acetate copolymer. The saponified ethylene/vinyl acetate copolymer to be used according to the present invention is preferably a copolymer having an ethylene content of 20 to 70 mol %, preferably 25 to 70 mol %, the degree of saponification of its vinyl acetate component preferably not being greater than 95 mol %. With an ethylene content of less than 20 mol %, the barrier properties under conditions of high humidity are not as high as would be desired, whereas an ethylene content exceeding 70 mol % results in reduced barrier properties. When the degree of saponification or of hydrolysis is less than 95 mol %, the barrier properties are sacrificed.

The term "barrier properties" is understood to mean impermeability to gases, to liquids and in particular to oxygen and, in the case of motor vehicles, to petrol. The invention relates more particularly to a petrol barrier for motor vehicles.

Among these saponified copolymers, those which have melt flow indices within the range from 0.5 to 100 g/10 min are particularly useful. Advantageously, the MFI (melt flow index) is chosen to be between 5 and 30 g/10 min (at 230° C./2.16 kg).

It is known that this saponified copolymer may contain small amounts of other comonomer ingredients, including α-olefins, such as propylene, isobutene, α-octene, α-dodecene, α-octadecene, etc., unsaturated carboxylic acids or their salts, partial alkyl esters, complete aklyl esters, nitriles, amides and anhydrides of the said acids, and unsaturated sulphonic acids or their salts.

As regards the EVOH-based blends, these are such that the EVOH forms the matrix, that is to say it represents preferably at least 40% by weight of the blend and preferably at least 50%. The other constituents of the blend are chosen from polyolefins, polyamides and, optionally, functional polymers.

By way of a first example of these EVOH-based blends of the second layer, mention may be made of the following compositions, comprising (by weight):

55 to 99.5 parts of EVOH copolymer;

0.5 to 45 parts of polypropylene and of compatibilizer, their proportions being such that the ratio of the amount of polypropylene to the amount of compatibilizer is between 1 and 5.

Advantageously, the ratio of the MFI of the EVOH to the MFI of the polypropylene is greater than 5 and preferably between 5 and 25. Advantageously, the MFI of the polypropylene is between 0.5 and 3 g/10 min (230° C./2.16 kg). According to one advantageous embodiment, the compatilizer is a polyethylene carrying polyamide grafts and it results from the reaction between (i) a copolymer of ethylene with an unsaturated monomer X, X being grafted or copolymerized, and (ii) a polyamide. The copolymer of ethylene with a grafted or copolymerized unsaturated monomer X, such that X is copolymerized, may be chosen from ethylene/maleic anhydride copolymers and ethylene/alkyl (meth)acrylate/maleic anhydride copolymers, these copolymers containing from 0.2 to 10% by weight of maleic anhydride and from 0 to 40% by weight of alkyl (meth) acrylate. According to another advantageous embodiment, the compatilizer is a polypropylene carrying polyamide grafts, which results from the reaction between (i) a propylene homopolymer or a propylene copolymer containing an unsaturated monomer X, being grafted or copolymerized, and (ii) a polyamide. Advantageously, X is grafted. The monomer X is advantageously an unsaturated carboxylic acid anhydride such as, for example, maleic anhydride.

By way of a second example of these EVOH-based blends of the second layer, mention may be made of the compositions comprising:

50 to 98% by weight of an EVOH copolymer;

1 to 50% by weight of a polyethylene; and 1 to 15% by weight of a compatibilizer consisting of a blend of an LLDPE or metallocene polyethylene and of a polymer chosen from elastomers, very low-density polyethylenes and metallocene polyethylenes, the blend being cografted with an unsaturated carboxylic acid or a functional derivative of this acid.

Advantageously, the compatilizer is such that the $MFI_{10}/MFI_2$ ratio is between 5 and 20, where $MFI_2$ is the melt flow index at 190° C. under a load of 2.16 kg, measured according to ASTM D1238, and $MFI_{10}$ is the melt flow index at 190° C. under a load of 10 kg, according to ASTM D1238.

By way of a third example of these EVOH-based blends of the second layer, mention may be made of the compositions comprising:

50 to 98% by weight of an EVOH copolymer;

1 to 50% by weight of an ethylene/alkyl (meth)acrylate copolymer; and 1 to 15% by weight of a compatibilizer resulting from the reaction between (i) a copolymer of ethylene with an unsaturated monomer X, which is grafted or copolymerized, and (ii) a copolyamide.

Advantageously, the copolymer of ethylene with a grafted or copolymerized, unsaturated monomer X, such that X is copolymerized, is an ethylene/maleic anhydride copolymer or an ethylene/alkyl (meth)acrylate/maleic anhydride terpolymer. Advantageously, these terpolymers contain from 0.2 to 10% by weight of maleic anhydride and from 0 to 40% by weight of alkyl (meth)acrylate.

With regard to the blend of a polyamide (A) and a polyolefin (B) of the third layer, the term "polyamide" is understood to mean products resulting from the condensation:

of one or more amino acids, such as aminocaproic, 7-aminoheptanoic, 11-aminoundecanoic and 12-aminododecanoic acids or of one or more lactams, such as caprolactam, oenantholactam and lauryllactam;

of one or more salts or mixtures of diamines, such as hexamethylenediamine, dodecamethylenediamine, metaxylylenediamine, bis-p(aminocyclohexyl)methane and trimethylhexamethylenediamine with diacids such as isophthalic, terephthalic, adipic, azelaic, suberic, sebacic and dodecanedicarboxylic acids.

By way of examples of a polyamide, mention may be made of PA-6 and PA-6,6.

It is also advantageous to use copolyamides. Mention may be made of the copolyamides resulting from the condensation of at least two alpha, omega-aminocarboxylic acids or of two lactams or of a lactam and of an alpha, omega-aminocarboxylic acid. Mention may also be made of the copolyamides resulting from the condensation of at least one alpha, omega-aminocarboxylic acid (or a lactam), at least one diamine and at least one dicarboxylic acid.

By way of examples of lactams, mention may be made of those having from 3 to 12 carbon atoms in the main ring and possibly being substituted. Mention may be made, for example, of $\beta,\beta$-dimethylpropriolactam, $\alpha,\alpha$-dimethylpropriolactam, amylolactam, caprolactam, capryllactam and lauryllactam.

By way of examples of alpha, omega-aminocarboxylic acids, mention may be made of aminoundecanoic acid and aminododecanoic acid. By way of examples of dicarboxylic acids, mention may be made of adipic acid, sebacic acid, isophthalic acid, butanedioic acid, 1,4-cyclohexyldicarboxylic acid, terephthalic acid, the sodium or lithium salt of sulphoisophthalic acid, dimerized fatty acids (these dimerized fatty acids have a dimer content of at least 98% and are preferably hydrogenated) and dodecanedioic acid $HOOC-(CH_2)_{10}-COOH$.

The diamine may be an aliphatic diamine having from 6 to 12 carbon atoms or it may be an aryl diamine and/or a saturated cyclic diamine. By way of examples, mention may be made of hexamethylenediamine, piperazine, tetramethylenediamine, octamethylenediamine, decamethylenediamine, dodecamethylenediamine, 1,5-diaminohexane, 2,2,4-trimethyl-1,6-diaminohexane, diamine polyols, isophoronediamine (IPD), methylpentamethylenediamine (MPDM), bis(aminocyclohexyl)methane (BACM) and bis(3-methyl-4 aminocyclohexyl)methane (BMACM).

By way of examples of copolyamides, mention may be made of copolymers of caprolactam and lauryllactam (PA-6/12), copolymers of caprolactam, adipic acid and hexamethylenediamine (PA-6/6,6), copolymers of caprolactam, lauryllactam, adipic acid and hexamethylenediamine (PA-6/12/6,6), copolymers of caprolactam, lauryllactam, 11-aminoundecanoic acid, azelaic acid and hexamethylenediamine (PA-6/6,9/11/12), copolymers of caprolactam, lauryllactam, 11-aminoundecanoic acid, adipic acid and hexamethylenediamine (PA-6/6,6/11/12) and copolymers of lauryllactam, azelaic acid and hexamethylenediamine (PA-6,9/12).

Advantageously, the copolyamide is chosen from PA-6/12 and PA-6/6,6. The advantage of these copolyamides is that their melting point is less than that of PA-6.

It is also possible to use any amorphous polyamide having no melting point.

The MFI of the polyamides and polyamide/polyolefin blends of the present invention is measured according to the rules of the art at a temperature of 15 to 20° C. above the melting point of the polyamide. With regard to blends based on PA-6, the MFI is measured at 23° C./2.16 kg. With regard to blends based on PA-6,6, the MFI is measured at 275° C./1 kg.

It is possible to use polyamide blends. Advantageously, the MFI of the polyamides is between 1 and 50 g/10 min.

It would not be outside the scope of the invention to replace part of polyamide (A) with a copolymer having polyamide blocks and polyether blocks, that is to say by using a blend comprising at least one of the above polyamides with at least one copolymer having polyamide blocks and polyether blocks.

The copolymers having polyamide blocks and polyether blocks result from the copolycondensation of polyamide blocks having reactive ends with polyether blocks having reactive ends, such as, inter alia:

1) polyamide blocks having diamine chain ends with polyoxyalkylene blocks having dicarboxylic chain ends;

2) polyamide blocks having dicarboxylic chain ends with polyoxyalkylene blocks having diamine chain ends, obtained by cyanoethylation and hydrogenation of aliphatic dihydroxylated alpha, omega-polyoxyalkylene blocks called polyetherdiols;

3) polyamide blocks having dicarboxylic chain ends with polyetherdiols, the products obtained being, in this particular case, polyetheresteramides. Advantageously, these copolymers are used.

Polyamide blocks having dicarboxylic chain ends derive, for example, from the condensation of alpha, omega-aminocarboxylic acids, of lactams or of dicarboxylic acids and diamines in the presence of a chain-stopping dicarboxylic acid.

The polyether may, for example, be a polyethylene glycol (PEG), a polypropylene glycol (PPG) or a polytetramethylene glycol (PTMG). The latter is also called polytetrahydrofuran (PTHF).

The number-average molar mass $\overline{M}_n$ of the polyamide blocks is between 300 and 15000 and preferably between 600 and 5000. The mass $\overline{M}_n$ of the polyether blocks is between 100 and 6000 and preferably between 200 and 3000.

Polymers having polyamide blocks and polyether blocks may also include randomly distributed units. These polymers may be prepared by the simultaneous reaction of the polyether and polyamide-block precursors.

For example, it is possible to react a polyetherdiol, a lactam (or an alpha, omega-amino acid) and a chain-stopping diacid in the presence of a small amount of water. A polymer is obtained having essentially polyether blocks and polyamide blocks of very variable length, but also the various reactants, having reacted in a random fashion, which are distributed randomly along the polymer chain.

These polymers having polyamide blocks and polyether blocks, whether they derive from the copolycondensation of polyamide and polyether blocks prepared beforehand or from a one-step reaction, have, for example, Shore D hardnesses which may be between 20 and 75 and advantageously between 30 and 70 and an intrinsic viscosity of between 0.8 and 2.5 measured in meta-cresol at 25° C. for an initial concentration of 0.8 g/100 ml. The MFIs may be between 5 and 50 (235° C., with a load of 1 kg).

The polyetherdiol blocks are either used as such and copolycondensed with polyamide blocks having carboxylic ends or they are aminated in order to be converted into polyetherdiamines and condensed with polyamide blocks having carboxylic ends. They may also be mixed with polyamide precursors and a chain stopper in order to make polyamide-block polyether-block polymers having randomly distributed units.

Polymers having polyamide and polyether blocks are described in U.S. Pat. Nos. 4,331,786, 4,115,475, 4,195,015, 4,839,441, 4,864,014, 4,230,838 and 4,332,920.

The ratio of the amount of copolymer having polyamide blocks and polyether blocks to the amount of polyamide is, by weight, advantageously between 10/90 and 60/40. Mention may also be made, for example, of blends of (i) PA-6 and (ii) copolymers having PA-6 blocks and PTMG blocks and blends of (i) PA-6 and (ii) copolymers having PA-12 blocks and PTMG blocks.

As regards polyolefin (B) of the blend of a polyamide (A) and a polyolefin (B) of the third layer, this may or may not be functionalized or it may be a blend of at least one functionalized polyolefin and/or at least one unfunctionalized polyolefin. To simplify matters, functionalized polyolefins will be described below as (B1) and unfunctionalized polyolefins as (B2).

An unfunctionalized polyolefin (B2) is conventionally a homopolymer or a copolymer of alpha-olefins or diolefins, such as, for example, ethylene, propylene, 1-butene, 1-octene and butadiene. By way of examples, mention may be made of:

ethylene homopolymers and copolymers, particularly LDPE, HDPE, LLDPE (linear low-density polyethylene) or VLDPE (very low-density polyethylene) and metallocene polyethylene;

propylene homopolymers and copolymers;

ethylene/alpha-olefin copolymers such as ethylene/propylene copolymers; EPRs (abbreviation for ethylene-propylene rubbers); and ethylene/propylene/diene copolymers (EPDM);

styrene/ethylene-butylene/styrene block copolymers (SEBS), styrene/butadiene/styrene block copolymers (SBS), styrene/isoprene/styrene block copolymers (SIS), styrene/ethylene-propylene/styrene block copolymers (SEPS);

copolymers of ethylene with at least one product chosen from salts or esters of unsaturated carboxylic acids such as alkyl (meth)acrylate (for example methyl acrylate), or vinyl esters of saturated carboxylic acids such as vinyl acetate, the proportion of comonomer possibly being as much as 40% by weight.

The functionalized polyolefin (B1) may be an alpha-olefin polymer having reactive units (the functional groups); such reactive units are acid, anhydride or epoxy functional groups. By way of example, mention may be made of the above polyolefins (B2) which are grafted or are copolymerized or terpolymerized with unsaturated epoxides such as glycidyl (meth)acrylate, or by carboxylic acids or the corresponding salts or esters, such as (meth)acrylic acid (this possibly being completely or partially neutralized by metals such as Zn, etc.) or else with carboxylic acid anhydrides such as maleic anhydride. A functionalized polyolefin is, for example, a PE/EPR blend, the weight ratio of which may vary between wide limits, for example between 40/60 and 90/10, the said blend being cografted with an anhydride, especially maleic anhydride, with a degree of grafting, for example, of 0.01 to 5% by weight.

The functionalized polyolefin (B1) may be chosen from the following (co)polymers, grafted with maleic anhydride or glycidyl methacrylate, in which the degree of grafting is, for example, from 0.01 to 5% by weight:

PE, PP, copolymers of ethylene with propylene, butene, hexene, or octene and containing, for example, from 35 to 80% by weight of ethylene;

ethylene/alpha-olefin copolymers such as ethylene/propylene copolymers; EPRs (abbreviation for ethylene-propylene rubbers); and ethylene/propylene/diene copolymers (EPDM);

styrene/ethylene-butylene/styrene block copolymers (SEBS), styrene/butadiene/styrene block copolymers (SBS), styrene/isoprene/styrene block copolymers (SIS), styrene/ethylene-propylene/styrene block copolymers (SEPS);

ethylene/vinyl acetate copolymers (EVA), containing up to 40% by weight of vinyl acetate;

ethylene/alkyl (meth)acrylate copolymers, containing up to 40% by weight of alkyl (meth)acrylate;

ethylene/vinyl acetate (EVA)/alkyl (meth)acrylate terpolymers, containing up to 40% by weight of comonomers.

The functionalized polyolefin (B1) may also be chosen from ethylene/propylene copolymers containing predominantly propylene, these being grafted with maleic anhydride and then condensed with monoaminated polyamide (or polyamide oligomer) (products described in EP-A-0 342 066).

The functionalized polyolefin (B1) may also be a copolymer or terpolymer of at least the following units: (1) ethylene, (2) an alkyl (meth)acrylate or a vinyl ester of a saturated carboxylic acid and (3) an anhydride such as maleic anhydride or a (meth)acrylic acid or an epoxy such as glycidyl (meth)acrylate. By way of examples of functionalized polyolefins of this latter type, mention may be made of the following copolymers, in which the ethylene preferably represents at least 60% by weight and in which the termonomer (the functional group) represents, for example, from 0.1 to 10% by weight of the copolymer:

ethylene/alkyl (meth)acrylate/(meth)acrylic acid or maleic anhydride or glycidyl methacrylate copolymers;

ethylene/vinyl acetate/maleic anhydride or glycidyl methacrylate copolymers;

ethylene/vinyl acetate or alkyl (meth)acrylate/(meth) acrylic acid or maleic anhydride or glycidyl methacrylate copolymers.

In the above copolymers, the (meth)acrylic acid may be salified with Zn or Li.

The term "alkyl (meth)acrylate" in (B1) or (B2) denotes $C_1$ to $C_8$ alkyl methacrylates and acrylates, and may be chosen from methyl acrylate, ethyl acrylate, n-butyl acrylate, isobutyl acrylate, 2-ethylhexyl acrylate, cyclohexyl acrylate, methyl methacrylate and ethyl methacrylate.

Moreover, the aforementioned polyolefins (B1) may also be crosslinked by any suitable process or agent (diepoxy, diacid, peroxide, etc.); the term functionalized polyolefin also includes blends of the aforementioned polyolefins with a difunctional reactive agent such as a diacid, dianhydride, diepoxy, etc., which is capable of reacting with them or blends of at least two functionalized polyolefins able to react together.

The copolymers mentioned above, (B1) and (B2), may be copolymerized so as to form random or block copolymers and may have a linear or branched structure.

The molecular weight, the MFI index and the density of these polyolefins may also vary over a wide range, as those skilled in the art will appreciate. MFI is the abbreviation for Melt Flow Index. It is measured according to the ASTM 1238 standard.

Advantageously, the non-functionalized polyolefins (B2) are chosen from propylene homopolymers or copolymers and any ethylene homopolymer or copolymer of ethylene and a comonomer of higher alpha-olefin type, such as butene, hexene, octene or 4-methyl-1-pentene. Mention may be made, for example, of high-density PP and PE, medium-density PE, linear low-density PE, low-density PE and very low-density PE. These polyethylenes are known to those skilled in the art as being produced by a "radical" process, by "Ziegler"-type catalysis or, more recently, by so-called "metallocene" catalysis.

Advantageously, the functionalized polyolefins (B1) are chosen from any polymer comprising alpha-olefin units and units carrying polar reactive functional groups such as epoxy, carboxylic acid or carboxylic acid anhydride functional groups. By way of examples of such polymers, mention may be made of ethylene/alkyl acrylate/maleic anhydride or ethylene/alkyl acrylate/glycidyl methacrylate terpolymers, such as the LOTADER® polymers from the Applicant, or maleic-anhydride-grafted polyolefins such as the Orevac® polymers from the Applicant, as well as ethylene/alkyl acrylate/(meth)acrylic acid terpolymers. Mention may also be made of propylene homopolymers and copolymers grafted with a carboxylic acid anhydride and then condensed with polyamides or monoaminated polyamide oligomers.

The MFI of (A) and the MFIs of (B1) and (B2) may be chosen within a wide range; however, it is recommended, in order to facilitate the dispersion of (B), that the MFI of (A) be greater than that of (B).

For small proportions of (B), for example 10 to 15 parts, it is sufficient to use a non-functionalized polyolefin (B2). The proportion of (B2) and (B1) in the (B) phase depends on the amount of functional groups present in (B1) and on their reactivity. Advantageously, (B1)/(B2) weight ratios ranging from 5/35 to 15/25 are used. It is also possible, for low proportions of (B), to use only a blend of polyolefins (B1) in order to obtain crosslinking.

According to a first preferred embodiment of the invention, the polyolefin (B) comprises (i) a high-density polyethylene (HDPE) and (ii) a blend of a polyethylene (C1) and a polymer (C2) chosen from elastomers, very low-density polyethylenes and ethylene copolymers, the (C1)+(C2) blend being cografted with an unsaturated carboxylic acid.

According to a variant of this first embodiment of the invention, the polyolefin (B) comprises (i) a high-density polyethylene (HDPE), (ii) a polymer (C2) chosen from elastomers, very low-density polyethylenes and ethylene copolymers, (C2) being grafted with an unsaturated carboxylic acid, and (iii) a polymer (C'2) chosen from elastomers, very low-density polyethylenes and ethylene copolymers.

According to a second preferred embodiment of the invention, the polyolefin (B) comprises (i) polypropylene and (ii) a polyolefin which results from the reaction of a polyamide (C4) with a copolymer (C3) comprising propylene and an unsaturated monomer X, grafted or copolymerized.

According to a third preferred embodiment of the invention, the polyolefin (B) comprises (i) a polyethylene of the LLDPE, VLDPE or metallocene type and (ii) an ethylene/alkyl (meth)acrylate/maleic anhydride copolymer.

According to a fourth preferred embodiment of the invention, the polyamide (A) is chosen from blends of (i) a polyamide and (ii) a copolymer having PA-6 blocks and PTMG blocks and blends of (i) a polyamide and (ii) a copolymer having PA-12 blocks and PTMG blocks, the weight ratio of the amount of copolymer to the amount of polyamide being between 10/90 and 60/40. According to a first variant, the polyolefin (B) comprises (i) a polyethylene of the LLDPE, VLDPE or metallocene type or (ii) an ethylene/alkyl (meth)acrylate/maleic anhydride copolymer; according to a second variant, the polyolefin comprises two functionalized polymers containing at least 50 mol % of ethylene units and able to react in order to form a crosslinked phase.

With regard to the first embodiment, the proportions (by weight) are advantageously the following:

60 to 70% of polyamide, 5 to 15% of the cografted blend of (C1) and (C2), the balance being high-density polyethylene.

With regard to the high-density polyethylene, its density is advantageously between 0.940 and 0.965 g/cm$^3$ and the MFI between 0.1 and 5 g/10 min (190° C./2.16 kg).

The polyethylene (C1) may be chosen from the abovementioned polyethylenes. Advantageously, (C1) is a high-density polyethylene (HDPE) having a density between 0.940 and 0.965 g/cm$^3$. The MFI of (C1) is between 0.1 and 3 g/10 min (190° C./2.16 kg).

The copolymer (C2) may, for example, be an ethylene-propylene elastomer (EPR) or ethylene/propylene/diene elastomer (EPDM). (C2) may also be a very low-density polyethylene (VLDPE) which is either an ethylene homopolymer or an ethylene/alpha-olefin copolymer. (C2) may also be a copolymer of ethylene with at least one product chosen from (i) unsaturated carboxylic acids, their salts and their esters, (ii) vinyl esters of saturated carboxylic acids and (iii) unsaturated dicarboxylic acids, their salts, their esters, their half-esters and their anhydrides. Advantageously (C2) is an EPR.

Advantageously, 60 to 95 parts of (C1) per 40 to 5 parts of (C2) are used.

The blend of (C1) and (C2) is grafted with an unsaturated carboxylic acid, that is to say (C1) and (C2) are cografted. It would not be outside the scope of the invention to use a functional derivative of this acid. Examples of unsaturated carboxylic acids are those having 2 to 20 carbon atoms, such as acrylic, methacrylic, maleic, fumaric and itaconic acids. The functional derivatives of these acids comprise, for example, anhydrides, ester derivatives, amide derivatives, imide derivatives and metal salts (such as alkali metal salts) of unsaturated carboxylic acids.

Unsaturated dicarboxylic acids having 4 to 10 carbon atoms and their functional derivatives, particularly their anhydrides, are particularly preferred grafting monomers. These grafting monomers comprise, for example, maleic, fumaric, itaconic, citraconic, allylsuccinic, cyclohex-4-ene-1,2-dicarboxylic, 4-methylcyclohex-4-ene-1,2-dicarboxylic, bicyclo[2.2.1]hept-5-ene-2,3-dicarboxylic and x-methylbicyclo[2.2.1]hept-5-ene-2,3-dicarboxylic acids and maleic, itaconic, citraconic, allylsuccinic, cyclohex-4-ene-1,2-dicarboxylic, 4-methylenecyclohex-4-ene-1,2-dicarboxylic, bicyclo-[2.2.1]hept-5-ene-2,3-dicarboxylic and x-methyl-bicyclo[2.2.1]hept-5-ene-2,2-dicarboxylic anhydrides. Advantageously maleic anhydride is used.

Various known processes can be used to graft a grafting monomer onto the blend of (C1) and (C2). For example, this may be achieved by heating the polymers (C1) and (C2) to a high temperature, about 150° C. to about 300° C., in the presence or absence of a solvent and with or without a radical initiator.

In the graft-modified blend of (C1) and (C2) obtained in the abovementioned manner, the amount of grafting monomer may be chosen appropriately, but it is preferably from 0.01 to 10% and better still from 600 ppm to 2%, with respect to the weight of cografted (C1)+(C2). The amount of grafted monomer is determined by assaying the succinic functional groups by FTIR spectroscopy. The MFI (190° C./2.16 kg) of the cografted (C1)+(C2) is 5 to 30 and preferably 13 to 20 g/10 min.

Advantageously, the cografted (C1)+(C2) blend is such that the $MFI_{10}/MFI_2$ ratio is greater than 18.5, $MFI_{10}$ denoting the melt flow index at 190° C. with a load of 10 kg and $MFI_2$ denoting the melt flow index with a load of 2.16 kg. Advantageously, the $MFI_{20}$ of the blend of the cografted polymers (C1) and (C2) is less than 24 g/10 min. $MFI_{20}$ denotes the melt flow index at 190° C. with a load of 21.6 kg.

With regard to the variant of the first embodiment, the proportions (by weight) are advantageously the following:

60 to 70% of polyamide, 5 to 10% of grafted (C2), 5 to 10% of (C'2), the balance being high-density polyethylene.

Advantageously, (C2) is an EPR or an EPDM. Advantageously, (C'2) is an EPR containing 70 to 75% ethylene by weight.

With regard to the second embodiment of the invention, the proportions (by weight) are advantageously the following:

60 to 70% of polyamide, 20 to 30% of polypropylene, 3 to 10% of a polyolefin which results from the reaction of a polyamide (C4) with a copolymer (C3) comprising propylene and an unsaturated monomer X, grafted or copolymerized.

The MFI (230° C./2.16 kg) of the polypropylene is advantageously less than 0.5 g/10 min and preferably between 0.1 and 0.5 g/10 min. Such products are described in EP 647 681.

The grafted product of this second embodiment of the invention will now be described. Firstly (C3) is prepared, this being either a copolymer of propylene and an unsaturated monomer X, or a polypropylene onto which an unsaturated monomer X is grafted. X is any unsaturated monomer that can be copolymerized with propylene or grafted onto polypropylene and having a functional group capable of reacting with a polyamide. This functional group may, for example, be a carboxylic acid, a dicarboxylic acid anhydride or an epoxide. As examples of monomer X, mention may be made of (meth)acrylic acid, maleic anhydride and unsaturated epoxides such as glycidyl (meth)acrylate. Advantageously, maleic anhydride is used. With regard to the grafted polypropylenes, X may be grafted onto propylene homopolymers or copolymers, such as ethylene/propylene copolymers consisting predominantly (in moles) of propylene. Advantageously, (C3) is such that X is grafted. The grafting is an operation known per se.

(C4) is a polyamide or a polyamide oligomer. Polyamide oligomers are described in EP 342 066 and FR 2 291 225. The polyamides (or oligomers) (C4) are products resulting from the condensation of the abovementioned monomers. Polyamide blends may be used. It is advantageous to use PA-6, PA-11, PA-12, a copolyamide having PA-6 units and PA-12 units (PA-6/12) and a copolyamide based on caprolactam, hexamethylenediamine and adipic acid (PA-6/ 6,6). The polyamides or oligomers (C4) may have acid, amine or monoamine terminal groups. In order for the polyamide to have a monoamine terminal group, all that is required is to use a chain stopper of formula:

in which:
R$_1$ is hydrogen or a linear or branched alkyl group containing up to 20 carbon atoms;
R$_2$ is a linear or branched, alkyl or alkenyl group having up to 20 carbon atoms, a saturated or unsaturated cycloaliphatic radical, an aromatic radical or a combination of the above. The chain stopper may, for example, be laurylamine or oleylamine.

Advantageously, (C4) is a PA-6, a PA-11 or a PA-12. The proportion by weight of C4 in (C3)+(C4) is advantageously between 0.1 and 60%. The reaction of (C3) with (C4) preferably takes place in the melt state. For example, it is possible to mix (C3) and (C4) in an extruder at a temperature generally between 230 and 250° C. The average residence time of the melt in the extruder may be between 10 seconds and 3 minutes and preferably between 1 and 2 minutes.

With regard to the third embodiment, the proportions (by weight) are advantageously the following:
60 to 70% of polyamide,
5 to 15% of an ethylene/alkyl (meth)acrylate/maleic anhydride copolymer,
the balance being a polyethylene of the LLDPE, VLDPE or metallocene type; advantageously the density of this polyethylene is between 0.870 and 0.925, and the MFI is between 0.1 et 5 g/10 min (190° C./2.16 kg).

Advantageously, the ethylene/alkyl (meth)acrylate/maleic anhydride copolymers contain from 0.2 to 10% by weight of maleic anhydride and up to 40% and preferably 5 to 40% by weight of alkyl (meth)acrylate. Their MFIs are between 2 and 100 g/10 min (190° C./2.16 kg). The alkyl (meth) acrylates have already been mentioned above. The melting point is between 80 and 120° C. These copolymers are commercially available. They are produced by radical polymerization at a pressure that may be between 200 and 2500 bar.

With regard to the fourth embodiment, the proportions (by weight) are advantageously the following:
According to a First Variant:
60 to 70% of the blend of a polyamide and a copolymer having polyamide blocks and polyether blocks,
5 to 15% of an ethylene/alkyl (meth)acrylate/maleic anhydride copolymer,
the balance being a polyethylene of the LLDPE, VLDPE or metallocene type; advantageously, its density is between 0.870 and 0.925 and the MFI is between 0.1 and 5 g/10 min (190° C./2.16 kg).

Advantageously, the ethylene/alkyl (meth)acrylate/maleic anhydride copolymers comprise from 0.2 to 10% by weight of maleic anhydride and up to 40%, and preferably 5 to 40%, by weight of alkyl (meth)acrylate. Their MFIs are between 2 and 100 g/10 min (190° C./2.16 kg). The alkyl (meth) acrylates have already been described above. The melting point is between 80 and 120° C. These copolymers are commercially available. They are produced by radical polymerization under pressure of between 200 and 2500 bar.

According to a Second Variant:
40 to 95% of the blend of a polyamide and a copolymer having polyamide blocks and polyether blocks;
60 to 5% of a blend of an ethylene/alkyl (meth)acrylate/ maleic anhydride copolymer and an ethylene/alkyl (meth)acrylate/glycidyl methacrylate copolymer.

The anhydride-based copolymer was defined in the first variant. The ethylene/alkyl (meth)acrylate/glycidyl methacrylate copolymer may contain up to 40%, advantageously 5 to 40%, by weight of alkyl (meth)acrylate and up to 10%, preferably 0.1 to 8%, by weight of unsaturated epoxide. Advantageously, the alkyl (meth)acrylate is chosen from methyl (meth)acrylate, ethyl acrylate, n-butyl acrylate, isobutyl acrylate and 2-ethylhexyl acrylate. The amount of alkyl (meth)acrylate is preferably from 20 to 35%. The MFI is advantageously between 5 and 100 g/10 min (190° C./2.16 kg) and the melting point is between 60 and 110° C. This copolymer can be obtained by radical polymerization of the monomers.

It is possible to add catalysts for accelerating the reaction between the epoxide and anhydride functional groups; among the compounds capable of accelerating the reaction between the epoxy functional group and the anhydride functional group, mention may be made in particular of:
tertiary amines, such as dimethyllaurylamine, dimethylstéarylamine, N-butylmorpholine, N,N-dimethylcyclohexylamine, benzyldimethylamine, pyridine, dimethylamino-4-pyridine, methyl-1-imidazole, tetramethylethyl-hydrazine, 1a N,N-dimethylpiperazine, 1a N,N,N',N'-tetramethyl-1,6-hexane-diamine, a blend of tertiary amines having from 16 to 18 carbon atoms and known as dimethyltallowamine:
tertiary phosphines, such as triphenylphosphine;
zinc alkyldithiocarbamates; and
acids.

The blends of the third layer may be prepared by melt-blending the various constituents in equipment standard to the thermoplastic polymer industry.

With regard to the optional vulcanized elastomer inner layer, the elastomer may be chosen from those mentioned for the inner layer. It is possible to choose the same elastomer as that of the outer layer or a different elastomer.

With regard to the tie layers, these are thus defined as any product which allows good adhesion between the layers in question, that is to say between the outer layer made of vulcanized elastomer and the EVOH layer, and between the layer of the blend of a polyamide and a polyolefin having a polyamide matrix and the inner layer made of vulcanized elastomer. The binder is advantageously chosen from copolyamides and functionalized polyolefins.

By way of examples of ties based on functionalized polyolefins, mention may be made of:
polyethylene, polypropylene, copolymers of ethylene with at least one alpha-olefin, blends of these polymers, all these polymers being grafted with unsaturated carboxylic acid anhydrides such as, for example maleic anhydride, or blends of these grafted polymers and of these non-grafted polymers;
copolymers of ethylene with at least one product chosen from (i) unsaturated carboxylic acids, their salts, their esters, (ii) vinyl esters of saturated carboxylic acids, (iii) unsaturated dicarboxylic acids, their salts, their esters, their half-esters, their anhyrides and (iv) unsaturated epoxides, it being possible for these copolymers to be grafted with unsaturated dicarboxylic anhydrides, such as maleic anhydrides, or unsaturated epoxides, such as glycidyl methacrylate.

With regard to ties of copolyamide type, the copolyamides that can be used in the present invention have a melting point (DIN 53736B standard) of between 60 and 200° C. and their relative solution viscosity can be between 1.3 and 2.2 (DIN 53727 standard; m-cresol solvent, 0.5 g/100 ml concentration, 25° C. temperature, Ubbelohde viscometer). Their melt rheology is preferably similar to that of the materials of the outer and inner layers.

The copolyamides derive, for example, from the condensation of alpha,omega-aminocarboxylic acids, of lactams or of dicarboxylic acids and diamines.

According to a first type, the copolyamides result from the condensation of at least two alpha,omega-aminocarboxylic acids or of at least two lactams having from 6 to 12 carbon atoms or of a lactam and of an aminocarboxylic acid not having the same number of carbon atoms, in the possible presence of a chain stopper which may, for example, be a monoamine or a diamine or a monocarboxylic acid or a dicarboxylic acid. Among chain stoppers, mention may be made in particular of adipic acid, azelaic acid, stearic acid and dodecanediamine. The copolyamides of this first type may also contain units which are residues of diamines and dicarboxylic acids.

By way of examples of dicarboxylic acids, mention may be made of adipic acid, nonanedioic acid, sebacic acid and dodecanedioic acid.

By way of examples of alpha,omega-aminocarboxylic acids, mention may be made of aminocaproic acid, aminoundecanoic acid and aminododecanoic acid.

By way of examples of lactams, mention may be made of caprolactam and lauryllactam (2-azacyclotridecanone).

According to a second type, the copolyamides result from the condensation of at least one alpha,omega-aminocarboxylic acid (or a lactam), at least one diamine and at least one dicarboxylic acid. The alpha,omega-aminocarboxylic acid, the lactam and the dicarboxylic acid may be chosen from those mentioned above.

The diamine may be a branched, linear or cyclic aliphatic diamine or else an aryl-type diamine.

By way of examples, mention may be made of hexamethylenediamine, piperazine, isophoronediamine (IPD), methylpentamethylenediamine (MPDM), bis (aminocyclohexyl)methane (BACM) and bis(3-methyl-4-amino-cyclohexyl)methane (BMACM).

By way of examples of copolyamides, mention may be made of the following:

a) 6/12/IPD.6 in which:
  6 denotes units resulting from the condensation of caprolactam,
  12 denotes units resulting from the condensation of lauryllactam (2-azacyclotridecanone),
  IPD.6 denotes units resulting from the condensation of isophoronediamine and adipic acid. The proportions by weight are 20/65/15, respectively.
  The melting point is between 125° C. and 135° C.

b) 6/6,6/12 in which:
  6 denotes units resulting from the condensation of caprolactam,
  6,6 denotes hexamethyleneadipamide (hexamethylene diamine condensed with adipic acid) units.
  12 denotes units resulting from the condensation of lauryllactam (2-azacyclotridecanone).
  The proportions by weight are respectively 40/20/40.
  The melting point is between 115° C. and 127° C.

c) pip.12/pip.9/11 in which:
  pip.12 denotes units resulting from the condensation of piperazine and a $C^{12}$ diacid;
  pip.9 denotes units resulting from the condensation of piperazine and a $C^9$ diacid;
  11 denotes units resulting from the condensation of aminoundecanoic acid,
  the proportions by weight are 35/35/30, respectively.

The processes for manufacturing copolyamides are known from the prior art and these copolyamides may be manufactured by polycondensation, for example in an autoclave.

The various layers of the tube of the invention, including the tie layers, may furthermore contain at least one additive chosen from:

fillers (minerals, fire retardants, etc.);

fibres;

dyes;

pigments;

brighteners;

antioxidants; and

UV stabilizers.

The entire disclosures of all applications, patents and publications, cited herein and of corresponding French application No. 0115184, filed Nov. 23, 2001, are incorporated by reference herein.

What is claimed is:

1. A multilayer tube comprising, radially from the outside inwards:
   a first layer of vulcanized elastomer forming an outer layer,
   a second layer of EVOH or of an EVOH-based blend,
   a third layer of a blend of a polyamide (A) and a polyolefin (B) having a polyamide matrix,
   optionally, an inner layer of vulcanized elastomer,
   the layers being successive and adhering to one another in their respective contact region.

2. The tube according to claim 1, which further includes a tie layer between the first and second layers.

3. The tube according to claim 2, in which the tie layer comprises functionalized polyolefins.

4. The tube according to claim 2, in which the tie layer comprises copolyamides.

5. The tube according to claim 1, further comprising a tie layer between the third layer and the vulcanized elastomer inner layer.

6. The tube according to claim 5, in which the tie layer comprises functionalized polyolefins.

7. The tube according to claim 5, in which the tie layer comprises copolyamides.

8. The tube according to claim 4, in which the copolyamides result from the condensation of at least two alpha,omega-aminocarboxylic acids or of at least two lactams having from 6 to 12 carbon atoms or of a lactam and of an aminocarboxylic acid not having the same number of carbon atoms.

9. The tube according to claim 7, in which the copolyamides result from the condensation of at least two alpha,omega-aminocarboxylic acids or of at least two lactams having from 6 to 12 carbon atoms or of a lactam and of an aminocarboxylic acid not having the same number of carbon atoms.

10. The tube according to claim 4, in which the copolyamides result from the condensation of at least one alpha, omega-aminocarboxylic acid, of a lactam, or of at least one diamine and at least one dicarboxylic acid.

11. The tube according to claim 7, in which the copolyamides result from the condensation of at least one alpha, omega-aminocarboxylic acid, of a lactam, or of at least one diamine and at least one dicarboxylic acid.

12. The tube according to claim 1, in which the polyolefin (B) of the third layer comprises (i) a high-density polyethylene (HDPE) and (ii) a blend of a polyethylene (C1) and a polymer (C2) which is an elastomer, a very low-density polyethylene or an ethylene copolymer, the (C1)+(C2) blend being cografted with an unsaturated carboxylic acid.

13. The tube according to claim 1, in which the polyolefin (B) of the third layer comprises (i) a high-density polyethylene (HDPE), (ii) a polymer (C2) which is an elastomer, a very low-density polyethylene or an ethylene copolymer, (C2) being grafted with an unsaturated carboxylic acid, and (iii) a polymer (C'2) which is an elastomer, a very low-density polyethylene or an ethylene copolymer.

14. The tube according to claim 1, in which the polyolefin (B) of the third layer comprises (i) polypropylene and (ii) a polyolefin which results from the reaction of a polyamide (C4) with a copolymer (C3) comprising propylene and an unsaturated monomer X.

15. The tube according to claim 1, in which the polyolefin (B) of the third layer comprises (i) a LLDPE, VLDPE or metallocene polyolefin and (ii) an ethylene/alkyl (meth) acrylate/maleic anhydride copolymer.

16. The tube according to claim 1, in which the polyamide (A) of the third layer is a blend of (i) a polyamide and (ii) a copolymer having PA-6 blocks and PTMG blocks; or a blend of (i) a polyamide and (ii) a copolymer having PA-12 blocks and PTMG blocks; the weight ratio of the amount of copolymer to the amount of polyamide being between 10/90 and 60/40.

17. The tube according to claim 16, in which the polyolefin (B) of the third layer comprises (i) a LLDPE, VLDPE or metallocene polyolefin and (ii) an ethylene/alkyl (meth) acrylate/maleic anhydride copolymer.

18. The tube according to claim 16, in which the polyolefin comprises two functionalized polymers containing at least 50 mol % of ethylene units and able to react in order to form a crosslinked phase.

* * * * *